J. A. McLARTY.
ORE REDUCING PROCESS.
APPLICATION FILED MAR. 8, 1912.
1,079,788.
Patented Nov. 25, 1913.
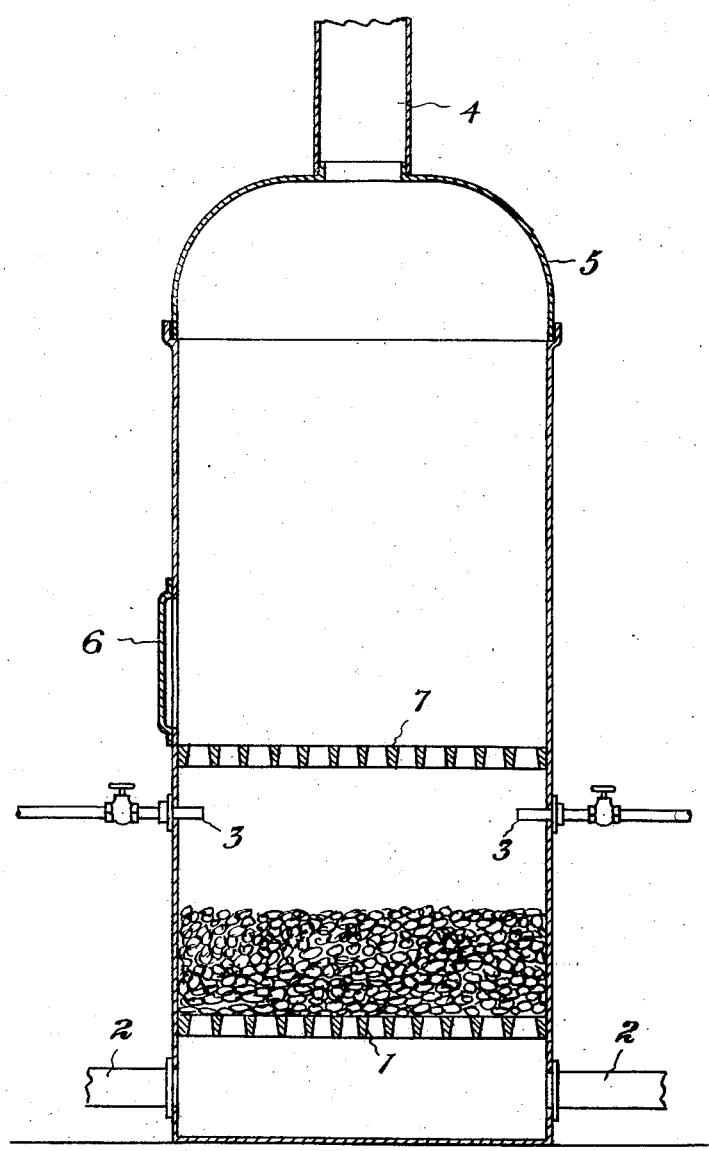
WITNESSES:
INVENTOR.
J. A. McLarty
BY J. Edward Maybee
ATTORNEY.

UNITED STATES PATENT OFFICE.

JAMES A. McLARTY, OF TORONTO, ONTARIO, CANADA.

ORE-REDUCING PROCESS.

1,079,788.  Specification of Letters Patent.  Patented Nov. 25, 1913.

Application filed March 8, 1912. Serial No. 682,541.

*To all whom it may concern:*

Be it known that I, JAMES A. MCLARTY, of the city of Toronto, in the Province of Ontario, Canada, have invented certain new and useful Improvements in Ore-Reducing Processes, of which the following is a specification.

This invention relates particularly to a process of reducing oxid ores by the action of reducing gases generated outside the ore itself and conducted thereto, and my object is to carry out the treatment in such a way that the heat of the fuel employed will be conserved as much as possible and the reduction carried on at as low a temperature as possible.

In carrying on the process I support the ore on a suitable grate above a bed of incandescent fuel such as coke. Air is admitted freely to the fuel so that carbon dioxid is largely formed. Above the burning fuel I inject into the hot products of combustion a spray of a liquid or gaseous hydrocarbon or I inject a finely powdered carbohydrate or any other material which will reduce the $CO_2$ to CO and yield hydrogen in the process. The temperature of the gas falls during this reaction but still remains sufficiently high (750–800° F.) to enable the gases to react with the ore to reduce the same. The reaction will take place effectively at a temperature above the temperature at which sulfur and similar impurities will sublime but below the temperature at which sulfur or carbon will combine with the iron.

As examples of the hydrocarbon preferably employed, I will say that crude petroleum or any of the distillates of crude petroleum may be employed; and as examples of the carbohydrate, I will say that either sawdust or other form of cellulose in finely divided condition, or sugar, or substances containing sugar, such as molasses, may be employed.

While I prefer to generate the $CO_2$, immediately below the ore to be treated on account of the heat economy obtained, it may be generated elsewhere but of course must be treated with the spray of hydrocarbon while at a comparatively high temperature so that the resultant reducing gases may not be too low in temperature to effect the reduction of the ore.

My process may be carried out in the apparatus illustrated in the accompanying drawing, which is a vertical section of a simple form of such apparatus.

On the lower grate 1 a suitable carbonaceous fuel is burned, air being supplied through the pipes 2. On the upper grate 7 or perforated plate the ore is supported and between the two grates is the nozzle 3, through which a hydrocarbon may be injected. A flue 4 for the escape of gases leads from the upper part of the furnace. The charge may be introduced by removing the cover 5 and the reduced metal removed through the manhole 6.

What I claim is:—

1. A process of reducing ores which comprises exposing hot carbonaceous fuel to the action of an excess of air, to produce gases containing carbon dioxid, and thereafter reacting upon the gases so produced with a material containing hydrogen and carbon, to produce reducing gases; and treating the ores with the resulting gases, at a temperature below a red heat.

2. A process of reducing ores which comprises exposing hot carbonaceous fuel to the action of an excess of air, to produce gases containing carbon dioxid, and thereafter reacting upon the gases so produced with a material containing hydrogen and carbon, to produce reducing gases; and treating the ores with the resulting gases, at a temperature of about 750 to 800° F.

3. A process of reducing ores which comprises exposing hot carbonaceous fuel to the action of an excess of air, to produce gases containing carbon dioxid, and thereafter reacting upon the gases so produced with a hydrocarbon, to produce reducing gases; and treating the ores with the resulting gases at a temperature below a red heat.

Toronto, this 6th day of March 1912.

JAMES A. McLARTY.

In the presence of—
EDW. MAYBEE,
E. P. HALL.